(12) United States Patent
Hebbar et al.

(10) Patent No.: US 6,385,500 B1
(45) Date of Patent: May 7, 2002

(54) HYBRID SERVOMECHANISM FOR MICRO-ELECTRICAL DISCHARGE MACHINING

(75) Inventors: Rajadasa R. Hebbar; Ramanujam Ramabhadran, both of Columbus; Srinivasan Chandrasekar, West Lafayette, all of IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/293,391

(22) Filed: Apr. 16, 1999

(51) Int. Cl.[7] ............................................. G06F 19/00
(52) U.S. Cl. ................ 700/162; 310/316.03; 219/69.11
(58) Field of Search .............................. 700/162, 159; 310/328, 316.03; 219/69.11, 68

(56) References Cited

U.S. PATENT DOCUMENTS

| | | | |
|---|---|---|---|
| RE29,398 E | * 9/1977 | Inoue | 219/69 |
| RE29,399 E | * 9/1977 | Inoue | 219/69 |
| 4,238,660 A | * 12/1980 | Bell, Jr. et al. | 219/69 |
| 4,348,573 A | 9/1982 | El-Menshawy et al. | 219/69.17 |
| 4,361,745 A | * 11/1982 | Rupert et al. | 219/69 |
| 4,378,960 A | 4/1983 | Lenz | 415/115 |
| 4,430,544 A | * 2/1984 | Inoue | 219/69 |
| 4,439,659 A | * 3/1984 | Shumizu | 219/69 |
| 4,528,451 A | 7/1985 | Petric et al. | 250/441.11 |
| 4,564,912 A | 1/1986 | Schwefel | 700/190 |
| 5,237,238 A | * 8/1993 | Berghaus et al. | 310/328 |
| 5,340,959 A | 8/1994 | Sawada et al. | 219/69.15 |
| 5,438,178 A | 8/1995 | Buhler et al. | 219/69.12 |
| 5,676,860 A | 10/1997 | Muro et al. | 219/69.2 |
| 6,121,568 A | * 9/2000 | Boccadoro et al. | 219/69.12 |
| 6,225,589 B1 | * 5/2001 | Bartok | 219/69.15 |
| 6,259,053 B1 | * 7/2001 | Baker | 219/69.13 |
| 6,262,514 B1 | * 7/2001 | Bansevicius et al. | 310/323.01 |

* cited by examiner

*Primary Examiner*—William Grant
*Assistant Examiner*—Ronald D Hartman, Jr.
(74) *Attorney, Agent, or Firm*—Woodard, Emhardt, Naughton, Moriarty & McNett

(57) ABSTRACT

The present invention relates to an improved servomechanism for regulating the spark gap in micro electrical discharge machining (micro-EDM). The present invention utilizes a hybrid two actuator servo system for positioning the micro-EDM electrode. The hybrid system comprises a fast, easily controllable, short stroke actuator (such as a piezoelectric actuator) for good instantaneous response, and a second, slower actuator for positioning the fast actuator and for providing the required long stroke. This allows the slower actuator to "feed" the electrode into the work-piece utilizing its long stroke, and the fast, short stroke actuator to respond quickly to instantaneous variations in the spark gap, such as short circuits.

16 Claims, 7 Drawing Sheets

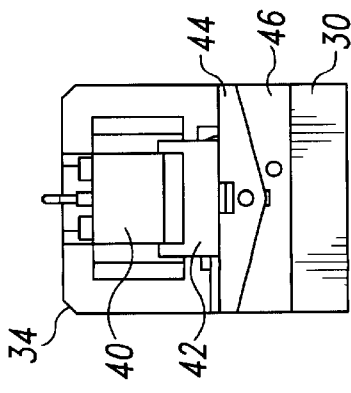
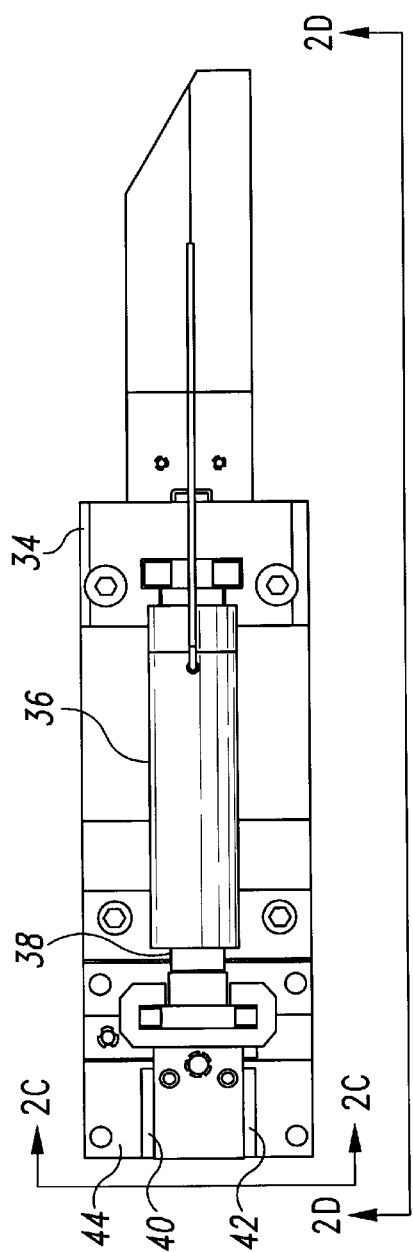
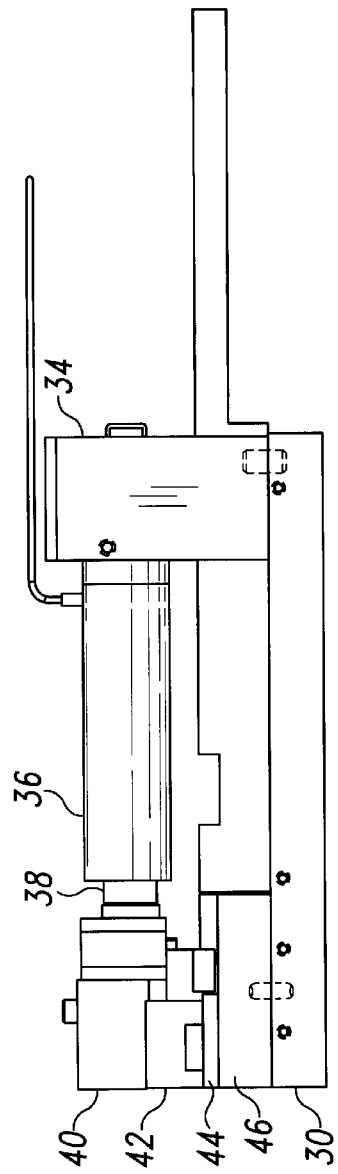
Fig. 2C
Fig. 2B
Fig. 2D

HYBRID SERVOMECHANISM FOR MICRO-ELECTRICAL DISCHARGE MACHINING

TECHNICAL FIELD OF THE INVENTION

The present invention generally relates to electrical discharge machining and, more particularly, to a hybrid servomechanism for micro-electrical discharge machining.

BACKGROUND OF THE INVENTION

Electrical discharge machining (EDM), or spark erosion, is a method of machining conductive materials by applying a series of electrical sparks in the presence of a dielectric. It was serendipitously discovered by B. R. Lazarenko and N. I. Lazarenko in 1943 in the process of trying to remove a stuck drill bit from a hole by means of pulsed electrical discharges. As shown schematically in FIG. 1, a spark discharge is produced by the controlled application of DC voltage pulses between two electrodes, namely, the workpiece 10 and the tool (electrode 12), which are separated by a distance of approximately 0.01 mm to 0.50 mm (spark-gap). A dielectric fluid 14 is present in the spark-gap. Upon pulsed application of a high voltage, the dielectric 14 in the gap is partially ionized, thus causing a spark discharge between the tool 12 and the work-piece 10.

Each discharge produces enough heat to melt or vaporize a small quantity of the work-piece 10 material, and this material is ejected at the end of the discharge, creating a tiny pit or crater that is left behind on the surface of the work-piece 10. This is the mechanism of material removal. Even though in EDM tool wear is high and the machining rate is much smaller than in turning, milling or grinding, it has still found a wide range of applications. The facts favoring EDM over conventional machining processing in some applications are its ability to: (1) remove machine materials of high hardness, high tensile strength and poor machineability; (2) machine complex or irregular shapes and intricate cavities; and (3) fabricate parts that are too thin and fragile to withstand the forces produced in conventional machining. Furthermore, the manufactured component is free of burrs. The largest application of EDM is in the machining of dies and molds, either before or after hardening; machining of carbides, tungsten and more recently conductive ceramics such as titanium di-boride, boron carbide and silicon carbide composites. Die-sinking and wire-cut EDM are the commonly used configurations for these applications.

A more recent EDM process that was developed in the late 1960's is micro-hole drilling, henceforth referred to as a micro-EDM process. An important application of this process is in the drilling of the small diameter (~150μ) orifice holes of fuel injector nozzles in diesel engines. Holes of diameter ~100 μm to 250 μm and with an aspect ratio greater than 5 (aspect ratio being the ratio of the depth of the hole to its diameter) are very expensive to drill by conventional means. Frequent tool re-sharpening, excessive drill breakage, the poor ability of hard alloys to withstand machining and formation of entry or exit burrs with mechanical drills make conventional drilling almost impractical as a production process for producing such micro-holes. But with micro-EDM, the machineability is more a function of the melting point rather than the hardness of the work material, and it is inherently a burr-free process. In conventional drilling, the hole diameter is primarily determined by the diameter of the drill and the operator has little control over the size of the resulting hole. But by the suitable selection of process parameters, it is possible to control, within bounds, the amount over-cut in EDM. Hence, for a given diameter of the tool electrode 12, the operator can control and adjust the diameter of the hole. The dimensional accuracy of the holes (i.e., their size and taper) produced by micro-EDM is usually superior to that produced by other unconventional processes such as electro-chemical machining (ECM) and laser machining. Hence, micro-EDM has become an established production process for the drilling of small holes.

Much effort has gone into understanding the physics of the EDM process and to relating the instantaneous gap conditions to the process performance. In this process, the machining is carried out by a series of electrical discharges which are applied between the tool 12 and work surfaces 10 in the presence of a liquid dielectric medium 14. A relaxation type, or a pulse generator type, of power supply provides a DC voltage of 100 to 200 volts between the tool electrode 12 (usually the cathode) and the work piece 10 electrode (usually the anode). The tool electrode 12 for hole drilling is in the form of a thin circular wire which is guided through closely matched ceramic guides. Tungsten or a tungsten-copper alloy is commonly used as the tool electrode 12 material because of its low rate of wear. The dielectric 14 is usually de-ionized water, which is drip-fed into the gap between the tool 12 and the work-piece 10 surfaces. At a critical value of the applied voltage, the dielectric 14 breaks down, causing an electrical discharge to occur between the tool 12 and the work surface 10. During every such discharge a small volume of material is removed from the work-piece 10 surface as a consequence of localized melting and ejection of the molten material. The crater produced by the localized melting is usually small, typically a few micrometers in width. The cumulative effect of a succession of such discharges spread over the entire work-piece 10 surface leads to its erosion, or machining to a shape which is approximately complementary to that of the tool 12.

As machining occurs, a servo system 16 advances the wire (tool) 12 in order to maintain a preset gap of about of 0.01 mm between the tool 12 and work surfaces 10. The action of the servo 16 in micro-EDM is based on a measurement of the average gap-voltage between the tool 12 and the work 10. In micro-EDM, exceptionally low energy pulses with a small pulse duration are used to obtain the high accuracy required. Furthermore, discharge repetition rates are high, as over a million discharges are required to machine a hole of diameter ~0.006 inches to a depth of ~0.030 inches. The electrical pulses that are used to initiate discharges are much smaller; the objective is to have discharges of small energy, ideally of the order of $10^{-7}$ to $10^{-5}$ Joules, removing smaller increments of material from the work-piece 10.

To compensate for a possible fall in machining rate, because of lesser material removal, the frequency of the pulses is increased to a few orders of magnitude greater than die-sinking or wire EDM processes; for example, typical current pulse widths are 150 nanoseconds to 250 nanoseconds, and at rates of a million discharges a second. This causes the gap conditions to change rapidly. At such high discharge rates, the reliability of discharge repetition suffers with the use of oil-based dielectrics, conventionally used in EDM; to increase the reliability, de-ionized water is used as a dielectric 14.

In order to obtain holes of good quality with a smooth and damage-free surface, and to maintain consistency of dimensions from one hole to another, it is desirable that the sparking discharges occur in a controlled and uniform manner. While certain types of discharges produce surfaces with a good finish, other types of discharges are known to cause work surface damage or not remove material at all. In a typical machining cycle it is desirable that the fraction of "good" machining discharges be kept as high as possible. The state-of-the-art EDM machines for microhole drilling are not adequately equipped to discriminate between the various types of discharge pulses. They are only equipped with a servo 16 which controls the feed of the tool electrode 12 in such a way as to maintain a constant gap between the front faces of the electrodes 10, 12. Such servo systems 16 respond to the average voltage in the spark-gap which is not a sensitive indicator of the "instantaneous" gap conditions or the efficiency of individual discharges (instantaneous gap condition meaning the condition existing in the machining gap during a single discharge pulse). Hence, the performance of the micro-EDM process is far from optimal. As a result, the process is not capable of fully meeting the exacting tolerance specifications required in many applications, such as for holes in fuel injectors for diesel engines and other similar applications in industry. Scrap levels are high, often as much as 30 percent and with the emission standards becoming more stringent (for diesel engines), there is a critical need for improving the micro-EDM process. In the diesinking application, previous researchers have characterized the instantaneous gap conditions in the EDM spark-gap through measurements of the gap voltage, gap current and radiation emissions in the radio-frequency band.

Several studies have been made of the nature of discharge pulses and their classification, based on measured electrical signals from the spark gap. For this discussion, the distribution of discharges occurring in EDM processes can be divided into four categories: (1) sparks; (2) arcs; (3) open circuits; and (4) short circuits. These four types of discharges have distinctive material removal properties. A spark discharge is characterized by the condition that when a voltage pulse is applied, the dielectric 14 breaks down, causing a steep reduction in the potential difference across the electrode and the work-piece. A pulse of current flows between the electrode 12 to work-piece 10 for a short duration, after which the discharge is quenched. If this discharge is characterized by high values for the voltage-time slopes and concomitant RF emissions that are high, it is classified as a spark discharge. Spark discharges have good material removal properties, in that a small amount of the work-piece 10 is eroded without much damage to the surrounding areas. After a discharge, there is a finite time needed for the dielectric 14 to de-ionize.

If subsequent voltage pulses are applied at the gap before this de-ionization is complete, then the potential difference between the tool 12 and work-piece 10 electrodes pulsates between zero and a fraction of the peak applied voltage. The voltage-time slope is lower, and the ensuing discharges, known as arcs, cause damage to portions of the work-piece 10 not machined. An arc is also characterized by a significantly lower RF emission than a spark. Arc-type discharges are more prevalent with the older RC type power supplies used in EDM. The term "RC" stands for Resistor and Capacitance—normally the charging and discharging of a capacitor through a resistor is a means for generating pulsed wave-forms, which are subsequently used in turning a power supply on and off. The product RC determines the frequency. It is noted that in many Micro-EDM applications, the percentage of such arcs is small, due to the use of the pulse-type power supply mechanism.

If the dielectric 14 strength is very low when a voltage pulse is applied, a short circuit results. In such a situation, there exists a continuous channel for current to flow between the electrode 12 and the work-piece 10. A short circuit can occur because of two reasons, namely, (a) the electrode being too close to portions of the work-piece that are not machined, or, (b) a situation where the removed material forms a debris close to the electrode in the machining zone. The second situation is often remedied by proper flowing of the dielectric medium, whereby the ejected material is removed at a regular rate. However, if the electrode is too deep inside the work-piece, more short circuits may occur due to the difficulty in removing the ejected material. It has been observed that this condition has a deleterious effect on machining, causing internal damage to the work-piece 10. A short circuit discharge train is characterized by almost no RF emission, high levels of current, and low values of the voltage-time slopes at discharge initiation.

In contrast to a short circuit, an open circuit refers to the absence of a discharge in the presence of a voltage pulse input. No material removal occurs during an open circuit condition, and consequently the duration of an open circuit should be kept within reasonable bounds. Thus, from the point of material removal, arcs and short circuits are bad discharges, while the spark type of discharge is desirable. The parameters of voltage slope and RF emission provide a means for discriminating between good and bad discharges.

Therefore, short circuits are undesirable disturbances that exist in the micro-EDM process. The lesser the short circuits in the process, the better the quality. Further, the machining time involved in the process can also be reduced if the percentage of "non-machining" discharges is reduced. The advantage of reduced machining time is in the reduction of the total cycle time, contributing to possible savings in capital investment. In micro-EDM, the total cycle time breaks down as follows: about 10 percent of the time is spent in preparation of the electrode, a process known as blunting; the loading and unloading of a part onto the machine takes about 10 percent of the cycle time; a flow test through the drilled components for dimensional tolerance takes about 5 percent, and the remaining 75 percent of the time is taken up in actual machining. Clearly, a significant reduction in this portion would contribute to a significant overall reduction in cycle time. For example, the drilling of micro-holes in fuel injector nozzles for atomization of fuel is done through the micro-EDM process. Despite possessing many advantages over conventional drilling for this application, a high cycle time is one of the major disadvantages of this process. A cycle time of 10 to 12 minutes for drilling eight holes in an injector nozzle is typical; a 12 minute hole typically includes 8 minutes for machining, 1 minute for electrode preparation, and 3 minutes for load, unload, and flow target checks through each nozzle. The total cycle time for six injectors per engine for this process alone is thus an hour and 12 minutes.

Maintaining a proper distance between the electrode 12 and the work-piece 10 is instrumental in determining the spark gap; this consequently determines the percentage of good spark discharges that occur between the electrode 12 and the work-piece 10. The electrode feed mechanism (servo 16) thus forms the principal component of an Electrical Discharge Machining (EDM) process; its function is to regulate the spark gap between the powered electrode 12 and the machined work-piece 10, whereby, (1) the formation of good machining discharges is effected; and (2) a fast recovery from bad machining conditions such as short circuits is ensured. Since sustained short circuits can cause a deterioration in metallurgical properties of the work-piece 10, an efficient feed and recovery mechanism must be designed to recover from or entirely prevent the occurrence of such conditions. A typical prior art feed mechanism is realized by coupling the electrode 12 to a servo-system 16. Typically, control schemes adopted in this servomechanism 16 are proportional, based on an averaged gap voltage feedback 20. Voltage signals applied to the electrode 12 in the EDM process are pulsed between zero and a maximum voltage at frequencies of several hundred kilohertz; since most actuators cannot respond at these frequencies, the gap voltage is filtered or averaged before being employed as a feedback signal 20. The motion of the actuator 16 is then regulated on the assumption that the actual gap between the electrode 12 is close to the work-piece 10 is proportional to the measured voltage difference; when the electrode 12 is close to the work-piece 10, the average potential difference between them falls to a percentage of the root mean squared value of the applied pulse voltage, and in the limiting case where both come into contact, the average potential difference is zero. Further, as the electrode 12 is drawn apart from the work-piece 10, the full applied voltage at the electrode 12 manifests as a potential difference with respect to the work-piece 10.

The traditional servomechanism 16 in EDM regulates the motion of the electrode 12 with a brush-less DC motor that is controlled by variations in the gap voltage through negative feedback 20. The electrode 12 is attached by means of a pneumatic clamp assembly to a mechanical slide. This slide is driven by the brush-less DC motor, with the rotation of the motor converted to linear motion of the slide by means of a lead screw or ball-screw. The typical stroke length employed in the drilling of fuel injector nozzles is about $1400\mu$ to $2500\mu$, depending on the wall thickness of the nozzle. This is a unique property of injector nozzle holes, where the depth of the hole (wall thickness) is many times the diameter of the hole.

The stroke length and the short circuit response form the major components that decide the specification of an EDM servomechanism 16. With the typical time for a discharge in small hole drilling being about 150–250 nanoseconds, at rates of over a million discharges per second, the gap conditions change so rapidly that the servomechanism 16 needs to respond very quickly in order to maintain the correct discharge gap. Ideally, a frequency response of the order of megahertz would be required for an actuator 16 to maintain the correct discharge gap based on an instantaneous gap voltage feedback. At the very least, a frequency response of several kilohertz is required for the servomechanism 16 to respond accurately to changing conditions at the gap. While the servomechanisms 16 used for prior art EDM with the brush-less DC servo motors can achieve the stroke length requirement with ease, their frequency response with the inherent delays in the control systems is only about 200 Hz. This causes an inadequate response, or even instability in responding to short circuits. It is not uncommon to see the servo 16 not sensing a short circuit, and allowing the electrode 12 to feed further into the work-piece 12, thus accentuating the damage. When the servo 16 finally responds to a string of short circuits, it retracts too far behind, causing a string of open circuits in sequence. Note that during this time, no machining occurs. This duration thus causes a direct increase in machining cycle time.

Faster servomechanisms, on the other hand, do not possess a long stroke. For example, piezoelectric actuators have frequency responses on the order of several kilo-hertz, but the stroke length of actuators for such a high frequency response is limited to a maximum of $100\mu$. This is the typical conflict that occurs between the requirement of a long stroke and a high frequency response. It is very difficult for an actuator to satisfy both these requirements simultaneously; therefore, there remains a need in the industry for an actuator having an adequately long stroke and an adequately high frequency response. The present invention is directed toward meeting this need.

SUMMARY OF THE INVENTION

The present invention relates to an improved servomechanism for regulating the spark gap in micro electrical discharge machining (micro-EDM). The present invention utilizes a hybrid two actuator servo system for positioning the micro-EDM electrode. The hybrid system comprises a fast, easily controllable, short stroke actuator (such as a piezo-electric actuator) for good instantaneous response, and a second, slower actuator for positioning the fast actuator and for providing the required long stroke. This allows the slower actuator to "feed" the electrode into the work-piece utilizing its long stroke, and the fast, short stroke actuator to respond quickly to instantaneous variations in the spark gap, such as short circuits.

In one form of the invention, a hybrid servomechanism for micro-electrical discharge machining is disclosed, comprising a first actuator having a first stroke length and a first frequency response; a platform coupled to said first actuator, wherein said first actuator is operative to move said platform; and a second actuator mounted to said platform and moving with said platform, said second actuator having a second stroke length and a second frequency response wherein the first stroke length is longer than the second stroke length and the first frequency response is slower than the second frequency response.

In another form of the invention, a hybrid servomechanism for micro-electrical discharge machining is disclosed, comprising a first actuator having a first stroke length and a first frequency response; a first slide coupled to said first actuator, wherein said first actuator is operative to move said slide; a base coupled to said first slide and moving with said first slide; a second slide in contact with said base, wherein said second slide may be moved independently of said base; a contact plate coupled to said second slide; a clamp coupled to said contact plate; and a second actuator having a first end coupled to said first slide and a second end coupled to said clamp to effect relative motion between said first slide and said second slide, wherein said second actuator has a second stroke length and a second frequency response wherein the first stroke length is longer than the second stroke length and the first frequency response is slower than the second frequency response.

In a further form of the invention, a method of controlling an electrode of a micro-electrical discharge machining device is disclosed, comprising the steps of (a) providing a first actuator having a first stroke length and a first frequency response; (b) providing a second actuator having a second stroke length and a second frequency response, wherein the first stroke length is longer than the second stroke length and the first frequency response is slower than the second frequency response; (c) feeding said electrode toward a work-piece using said first actuator; and (d) maintaining a predetermined spark gap between said electrode and said work-piece using said second actuator.

BRIEF DESCRIPTION OF THE DRAWINGS

FIGS. 2A–D are various views of a preferred hybrid servomechanism of the present invention.

DETAILED DESCRIPTION OF THE PREFERRED EMBODIMENTS

Figure 1:
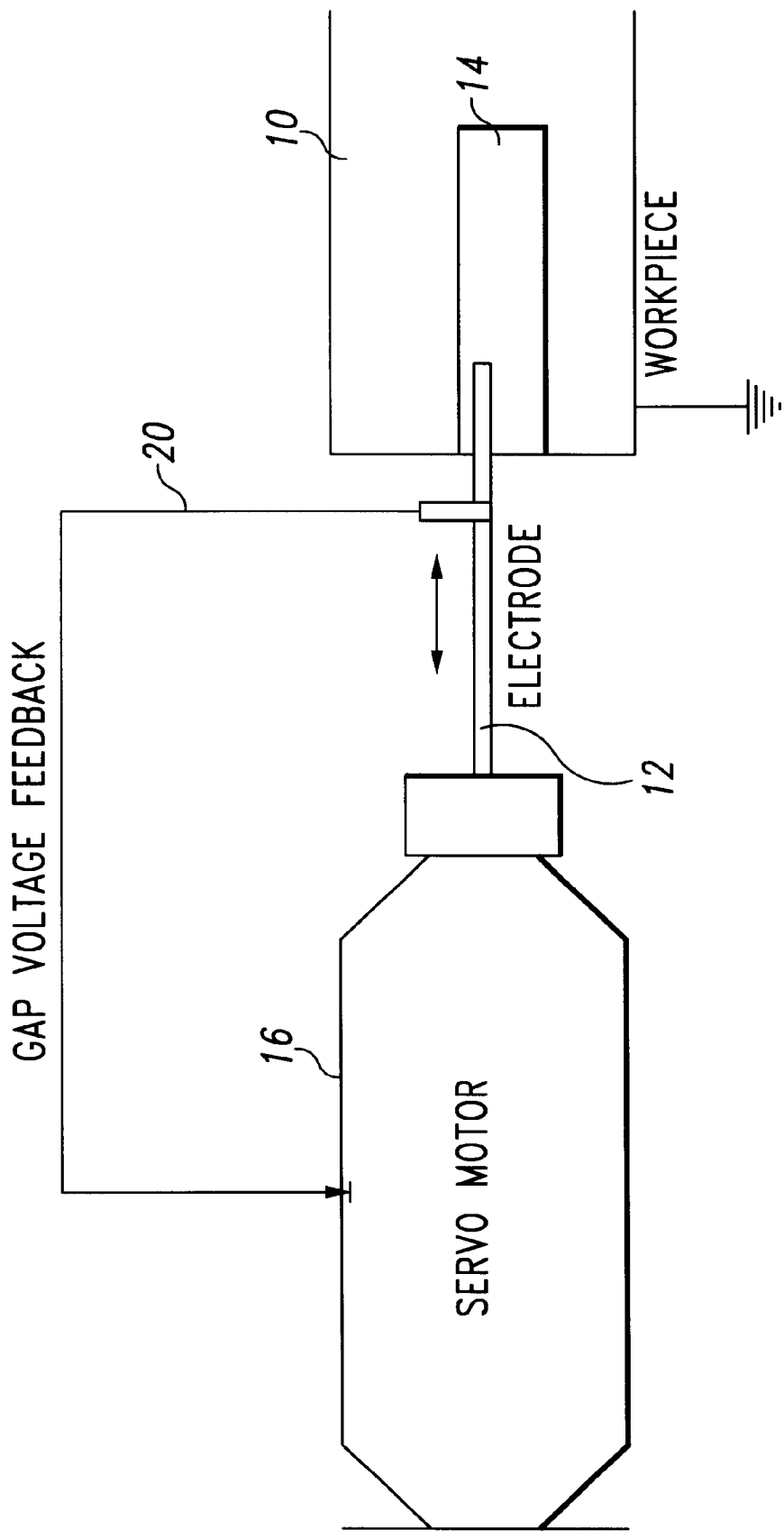
FIG. 1 is a schematic diagram of a prior art micro-EDM control system utilizing a single servomechanism.
Figure 2A:
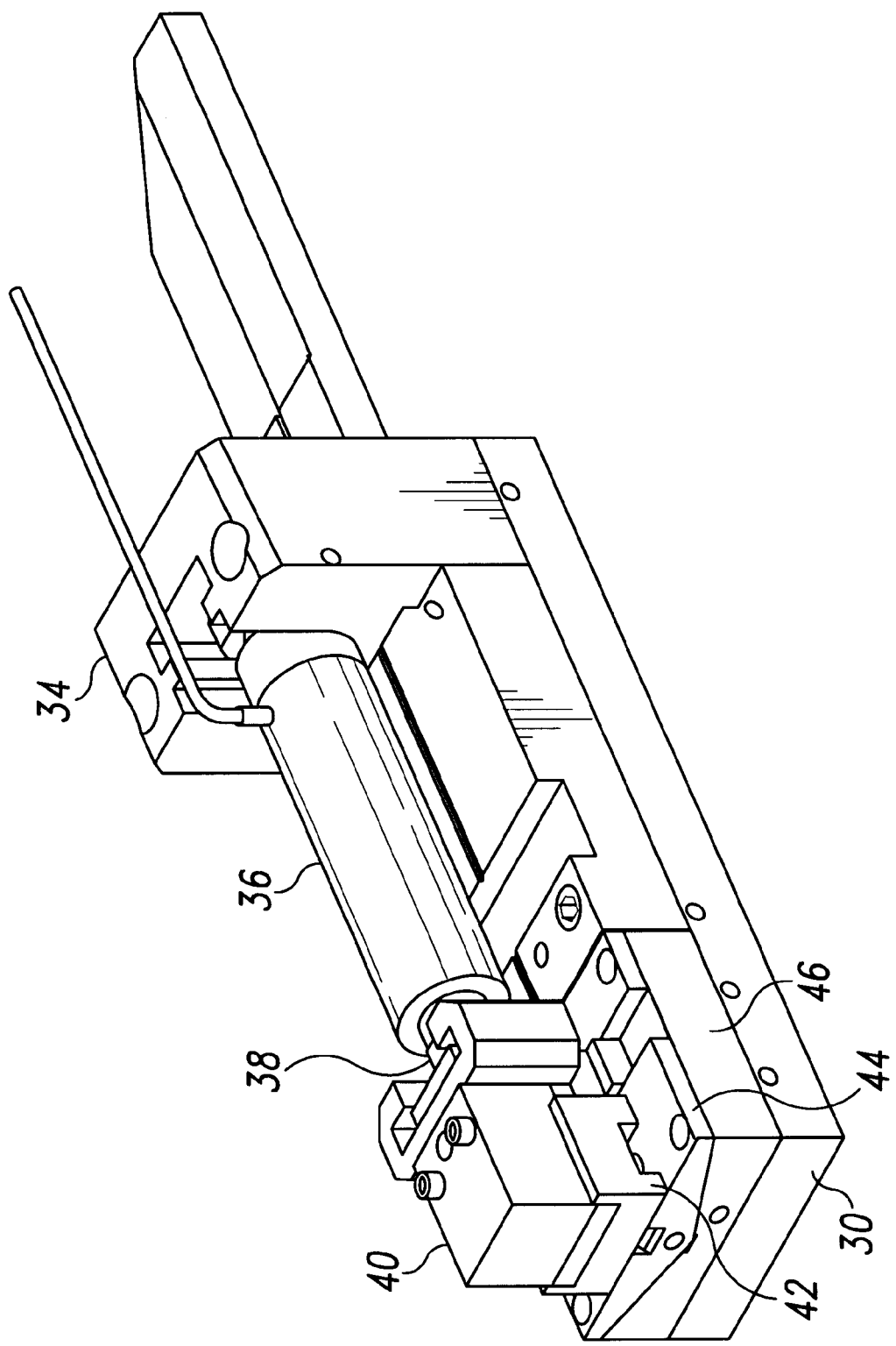

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Since it is not possible for the same actuator to satisfy the dual requirements of a long stroke and a fast response, the present invention uses a dual actuator servo system, or a hybrid servomechanism for drilling micro-holes through EDM. The essential idea is to use the slower actuator to "feed" the electrode into the work-piece, utilizing the long stroke, and to use the fast actuator to respond quickly to instantaneous variations in the gap, albeit within a shorter stroke. Desirable, but not necessarily required, attributes at such an actuator are (1) the mechanism should satisfy the requirements of long stroke and a response time of less than 1 millisecond for a short circuit; (2) the mechanism should preferably be a retrofit to the existing servomechanisms on the EDM machines; (3) the first level electronic feedback controls for the two actuators must be independent; and (4) the retrofit should be inexpensive, in comparison with other available servo performance improvement options. The concept of the hybrid servomechanism, or the two actuator servomechanism, of the present invention fits well with these four criteria. Of the two actuators in the present invention, one is a fast actuator with a short stroke, while the other is a conventional electromechanical actuator with a long stroke and a relatively slow response. The servomechanisms already installed on the EDM machines are thus well suited to function as slow actuators, and can therefore be retained as already installed when using the present invention in a retrofit application. The remaining issue, which calls for the selection of a fast actuator, and its integration with the existing servomechanism, raises three design issues to be addressed. These are (1) the selection of the fast actuator that satisfies the four criteria outlined above; (2) the mechanical fixtures and modifications needed to complete the retrofit on an existing EDM machine; and (3) the control system for the fast actuator and optimization of the overall control system.

Selection of the Fast Actuator

Two options were studied by the present inventors for the selection of the fast actuator with the short stroke, namely, the piezoelectric translator, and the voice coil actuator. The voice coil actuator is also electromechanical in nature, and has a longer stroke than the piezoelectric actuator, with the added advantage of a fast response. Nevertheless, in terms of the simplicity of electronic control systems, and the ease of mechanical retrofit, the piezoelectric actuator is the preferred embodiment. A commercial off-the-shelf low voltage piezoelectric translator with a stroke of $45\mu$ was chosen as the preferred embodiment of the present invention. (This translator, model P-844.30 is manufactured by Physik Instrument GmbH & Co. of Germany, and is available from Plytec PI Inc. at 508-832-3456).

The main advantages of the selected piezoelectric translator are its robustness, and ease of control. These actuators are electrically controllable, and can provide very precise movements, from the sub-nanometer range to the millimeter range with high accuracy. Piezoelectric actuators function based on the piezoelectric effect discovered by Pierre Curie. The piezoelectric effect, as discovered in 1880, explained the ability of certain crystalline materials to generate an electrical charge proportional to an externally applied mechanical force. Conversely, the piezoelectric effect also allows for the expansion of certain materials as a response to an applied electric field, exhibiting linear dependence. The expansion of the material also includes effects of hysteresis. However, the magnitude of the hysteresis remains the same, relative to the distance moved, irrespective of the peak electrical strength. An important feature of these actuators is that despite their small size, they can generate large forces, with pushing forces up to 3000N, and pulling forces of 700N. This factor is important in EDM, especially with the need to retract the electrode in response to short circuits.

The specification of the preferred embodiment actuator is listed in Table 1.

TABLE 1

| Specification for preferred embodiment actuator | |
|---|---|
| Nominal expansion for +100 V | $45\mu$ |
| Maximum pushing force | 3000 N |
| Maximum pulling force | 700 N |
| Electrical capacitance | 22 $\mu$F |
| Stiffness | 67 N/$\mu$m |
| Resonant frequency | 9 kHz |
| Weight | 144 grams |
| Total length | 83 mm |

The resonant frequency and the electrical capacitance are important in designing the complete fast actuator system for EDM. Both dictate the range for the control signal that energizes the piezoelectric actuator. The mechanical resonant frequency is for the actuator per se, and the addition of fixtures for installation and retrofit will reduce this number. The electrical capacitance specification, mentioned above, is for the small-signal range. This requirement should be carefully considered in designing the control system. Since the frequency of discharges in EDM is high, a low pass filter is designed for filtering the gap voltage before use in control applications. The piezoelectric actuator functions as an electrical capacitor in high frequencies, and this needs to be considered in designing the electronic amplifier for the control system.

Mechanical Design for Retrofit

In a retrofit application of the present invention, the concept of the fast servomechanism for drilling micro-holes through EDM thus consists of the regular DC motor based servomechanism as the slow servo, with the fast piezoelectric actuator added on as a retrofit to a regular production EDM machine (of course, the present invention may also be used in non-retrofit applications). The mechanical design is arranged so that the retrofit requires minimum modification to the existing fixtures on the machine. The installation of the fast actuator is preferably done in such a manner as to allow it to be removed very quickly. FIGS. 2A–D show a schematic of the preferred embodiment mechanism. The EDM slide or the base plate 30 is driven by the DC motor (not shown) which functions as the slower servomechanism. The piezoelectric actuator 32 functions as a fast servomechanism, and is fixed on a mounting block 34 installed on the base plate 30 as shown. The piezoelectric actuator 32 consists of two concentric cylinders; the outer (stationary) cylinder 36 is mounted on the mounting block 34, while the inner cylinder 38 is coupled to the EDM clamp head assembly 40, pressing against the contact plate 42 for the electrode (not shown). The EDM clamp 40 and contact plate 42 are attached to a V-slide 44 that moves against a fixed V-base 46. These are preferably made of ABS plastic, lined with TEFLON (PTFE) strips, so that the TEFLON strip on the slide moves on the TEFLON strip of the base, yielding maximum smoothness of motion. The V-base 46 is attached to the base plate 30. Therefore, movement of the base plate 30 moves all of the components 32–46 by the same amount. Additionally, movement of the small cylinder 38 of the piezoelectric actuator 32 moves the EDM clamp 40, contact plate 42 and electrode by an independent amount.

Electronic Control system for the Fast Actuator

The piezoelectric actuator 32 of the preferred embodiment is controlled by an applied voltage. Being a low voltage piezoelectric translator (LVPZ), the applied voltage ranges from zero to a hundred volts. As the voltage increases from zero to full scale, the actuator 32 expands linearly, over the full selected range ($45\mu$ in this case). The design of the electronic control system for the actuator 32 should preferably consider the following criteria (although these are not required): (1) the control system should be non-interactive in that it should not modify the base servo control system on the machine; (2) the control system should maintain the appropriate gap, and respond quickly to short circuits, without oscillation; (3) the control system should have a frequency response limit compatible with the response of the actuator 32; and (4) any acquisition of signals from the spark gap should introduce minimal variation in sparking characteristics.

The preferred embodiment electronic control system of the present invention is configured based on negative feedback, and it is assumed that the relationship between the spark gap and the measured voltage is a monotone increasing function. Thus, an increase in the gap voltage is seen as corresponding to an increase in the spark gap between the electrode and the work-piece. The gap voltage is used as a sensor in the feedback control scheme. The measurement of the gap voltage and the bus voltage is done through the use of measurement probes that are impedance matched with the electronic control circuit for the fast actuator 32. The measurement probes serve to scale down the gap voltage to a level that can be used with low voltage amplifiers and components. These probes have a capacitance of the order of picofarads and do not introduce appreciable artifacts that could change the characteristics of the spark gap. Note that simple resistive dividers are not preferred to scale down the voltage measured at the gap; these dividers have significant capacitance at high frequencies, and act as low pass filters, in addition to altering the gap characteristics.

Figure 3:
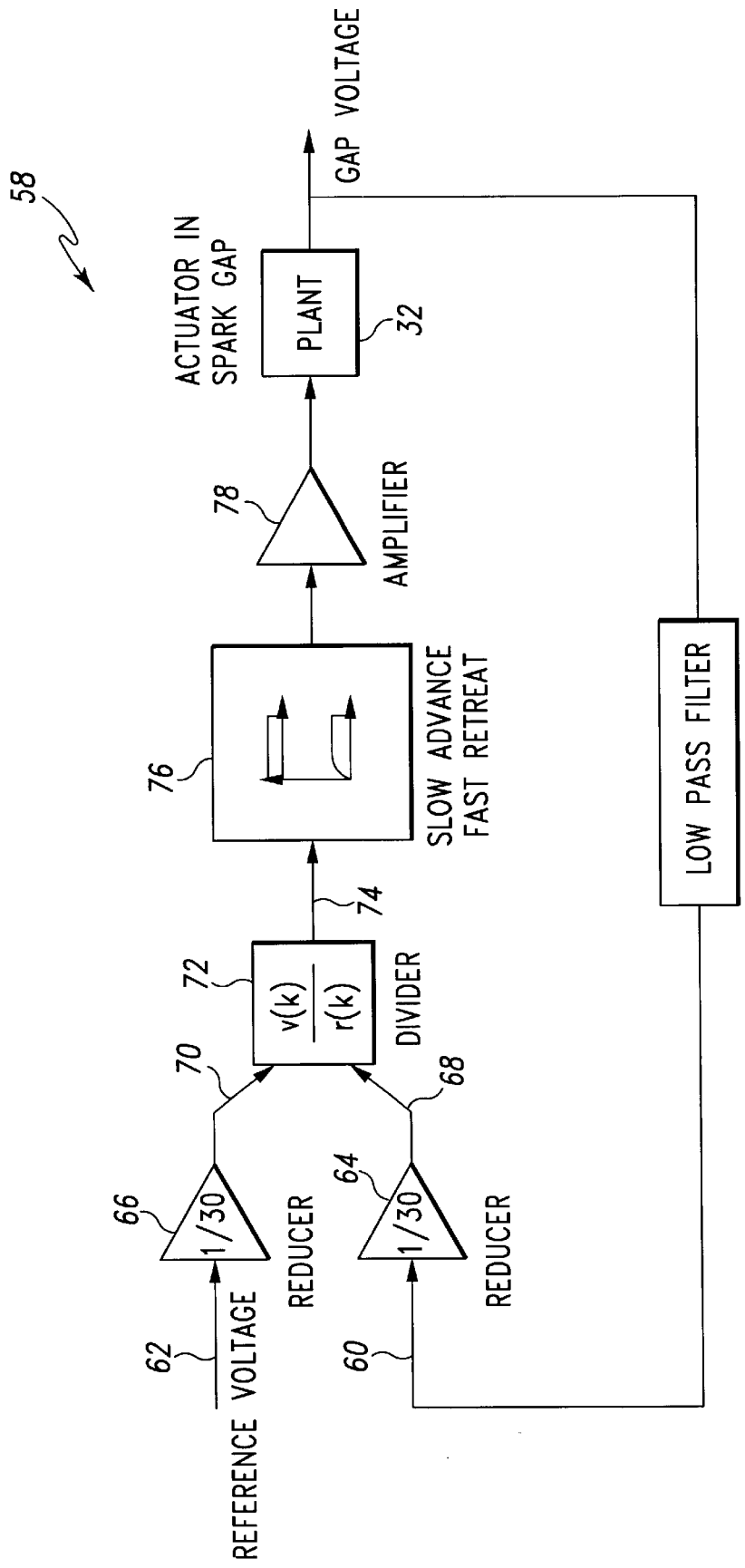
FIG. 3 is a schematic block diagram of a preferred embodiment electronic control circuit of the present invention.

A schematic of the preferred embodiment control circuit of the present invention is shown in FIG. 3. Two voltage signals are required for the functioning of this circuit: one is the actual measured gap voltage 60, from a 10:1 probe, and the other is the stable open circuit applied voltage level 62, before pulsing at the gap (referred to as the bus voltage, also measured through a similar probe). The voltage applied at the spark gap is a series of pulses that vary between 0 and maximum voltage value. This maximum value is changed as we go deeper into the work-piece, in order to facilitate material removal. This maximum value is referred to as the bus voltage 62. The gap voltage 60 and bus voltage 62 are fed through buffer amplifiers 64, 66 that also function as low pass filters. The low pass filter essentially serves to eliminate very high frequency components in the megahertz range. The filtered gap voltage 68 and bus voltage 70 are passed through a divider 72 that divides the gap voltage 68 by the bus voltage 70 and amplifies the ratio to a range of (0–10) volts. This output 74 is now passed through a nonlinear filter 76, amplified for regulation against any line losses, and fed to the actuator 32 through a bipolar operational source sink amplifier 78.

Figure 4A:
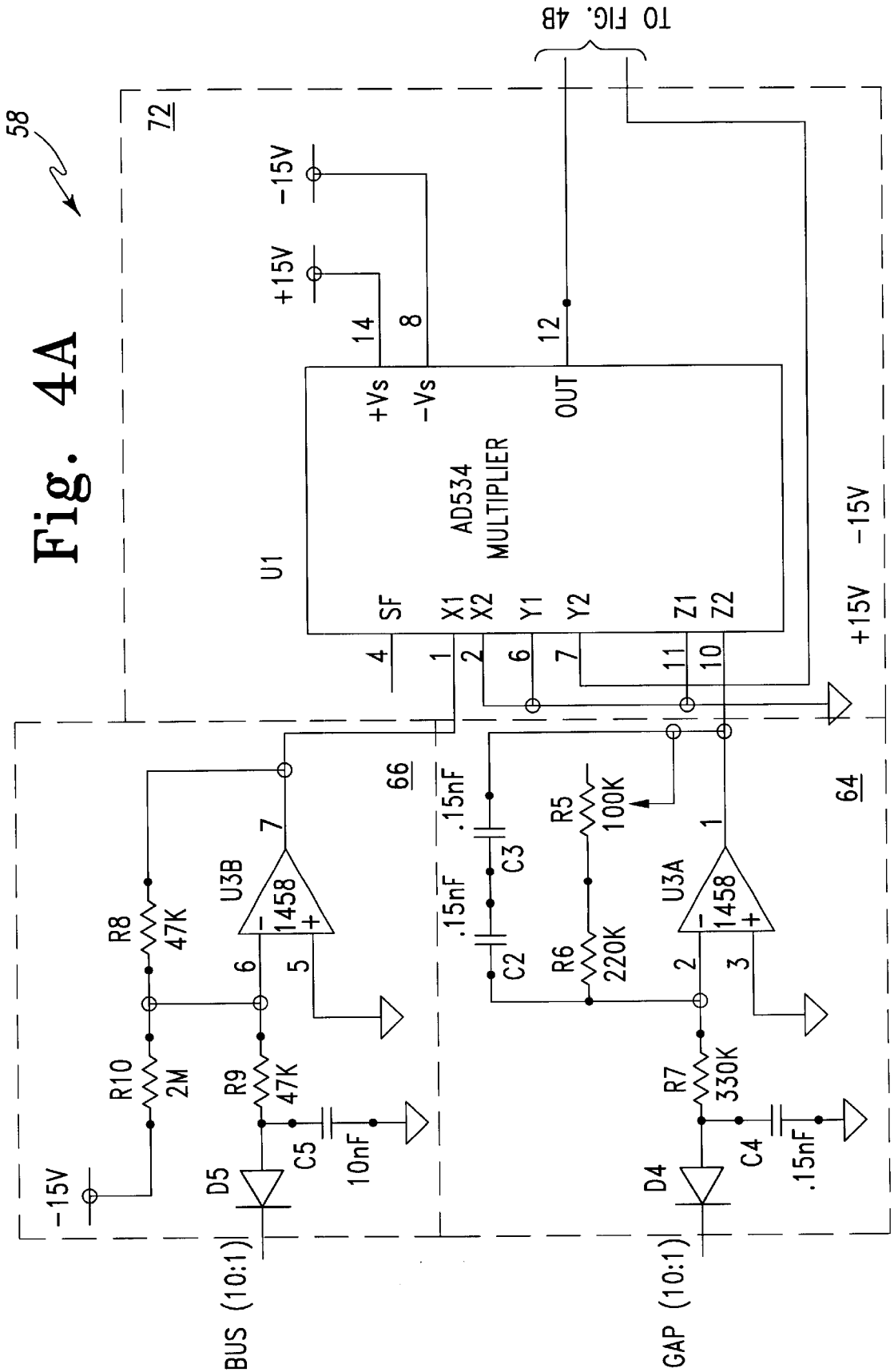
FIG. 4 is a schematic circuit diagram of the preferred embodiment electronic control circuit of FIG. 3.
Figure 4B:
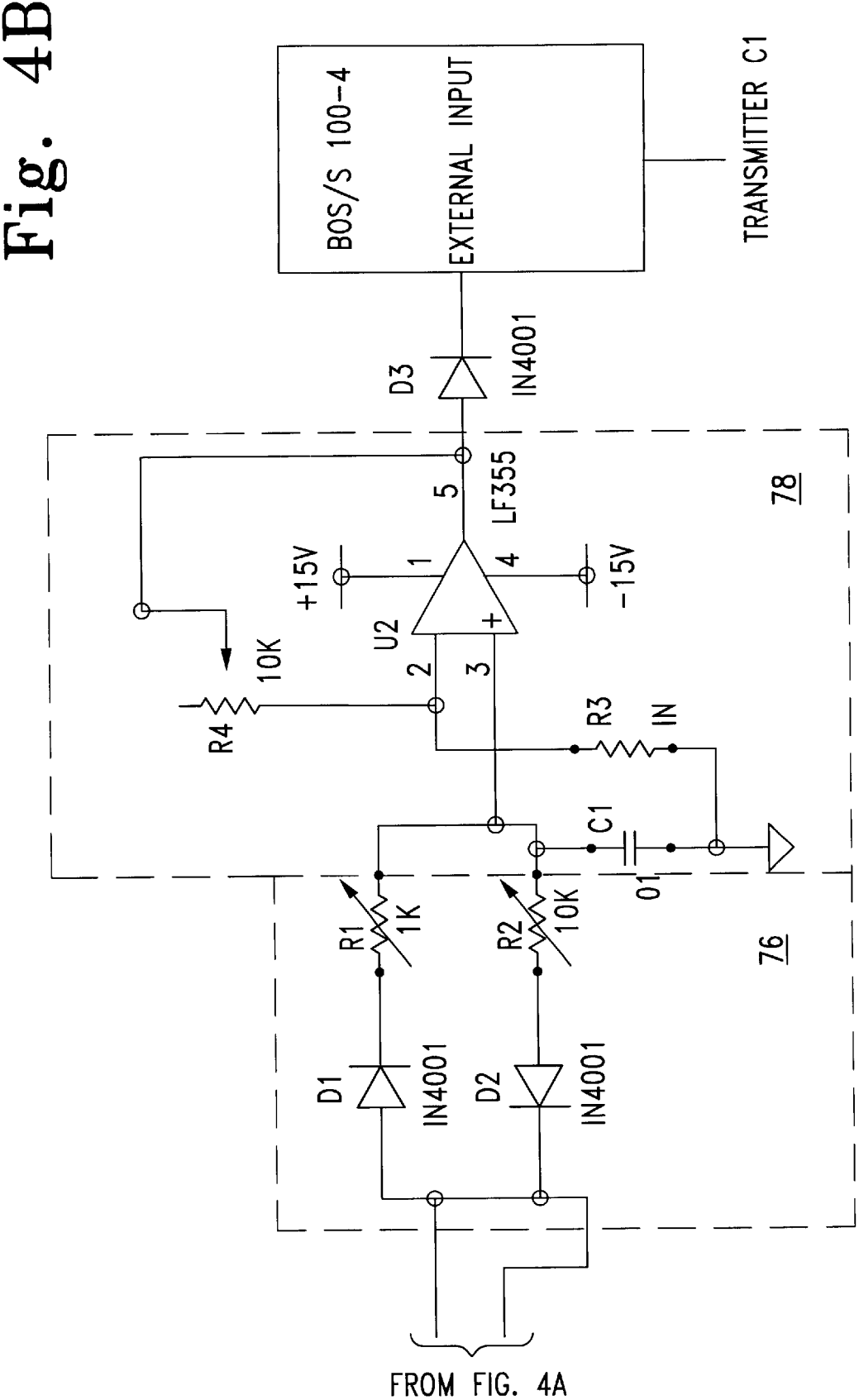

The layout of the electronic control circuit 58 is shown in FIG. 4. The electronic control circuit 58 has two main features: one is the divider 72 that takes the ratio of the gap voltage 60 and bus voltage 62, and the second being the nonlinear filter 76. The function of the divider 72 is to regulate the actuator's response to relative variation, and compensating for increased gap and bus voltage levels. For example, as the electrode moves into the work-piece, the gap voltage level 68 is increased. If the gap voltage 60 alone is fed back, the effective actuator 32 stroke would increase as we penetrate the hole. Instead, if the gap voltage 60 is divided by the maximum voltage 62 at each point, the relative variation controls the actuator 32, and the stroke is uniform through the entire machining cycle.

Figure 5:
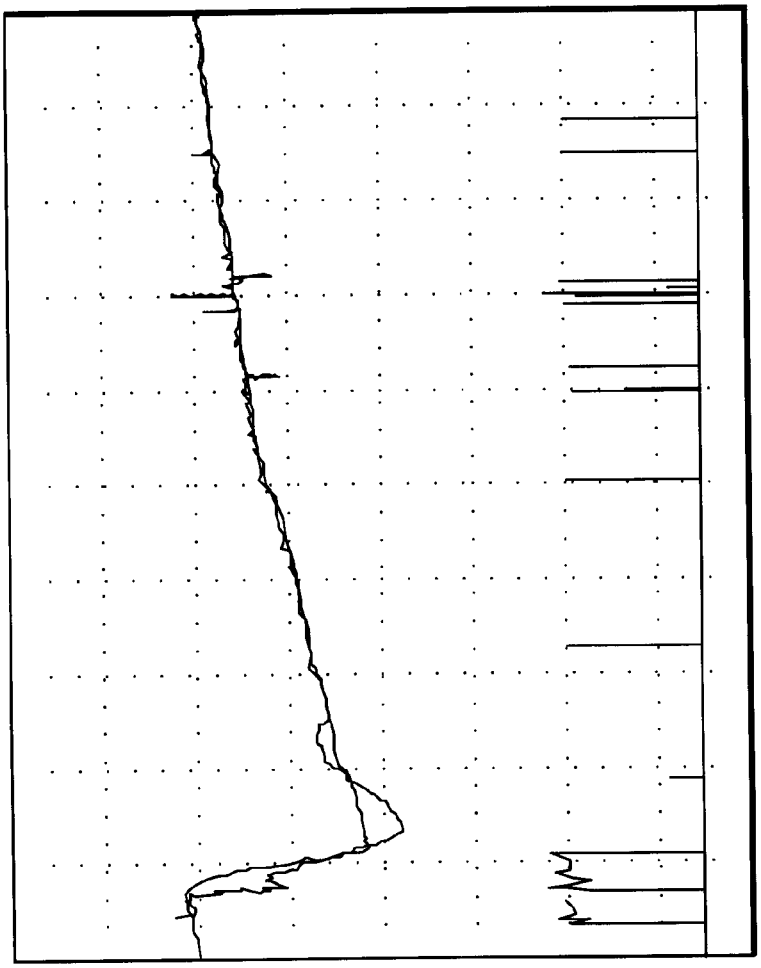
FIG. 5 is a graph of voltage versus time, showing the command voltage produced by the circuit of FIG. 4 in response to a short circuit of the spark gap.

The function of the nonlinear filter 76 on the other hand, is to regulate the response to short circuits. It was found that if the gap voltage 60 goes to zero, the piezoelectric actuator 32 is made to retract immediately. However, the actuator 32 immediately senses an open circuit because of the increased gap, and rushes forward at the same speed. This causes an oscillation because of prolonged short circuits. What is desired is that the retraction of the actuator 32 be done fast and the expansion speed be reduced. This causes the actuator 32 to respond quickly to short circuits, and to slowly advance to an open circuit. The proper selection of these speeds allows some time for the gap to recover in the wake of a short circuit, and avoids oscillations. The nonlinear filter 76 contains a pair of diodes D1 and D2 that allow charging and discharging time constants to vary, realizing the fast retraction and slow expansion. A conservative response to a short circuit is shown in FIG. 5, where the expansion rate is very slow compared to the retraction rate. This causes a total open circuit to last while the electrode closes in on the work-piece after the short circuit.

Optimization of the Base Servo System Parameters

The electronic control circuit 58 for the fast actuator 32 does not modify the base servo control system. However, the frequency response of the base servo system must be set so that the two servomechanisms do not interact in an undesirable manner. Ideally, the base servomechanism, being the slower of the two, should serve as a feed and positioning device that moves a constant rate into the work-piece. However, it should also function as a backup when the stroke of the fast actuator 32 is too small to recover from a massive short circuit. Ideally, the parameters of the base servomechanism should be set such that this situation never occurs, or is at best very infrequent.

Most conventional EDM servomechanisms have two parameters: the feed, regulating the particular gap distance that the electrode is supposed to maintain, and the response, that regulates the rate or quickness of response to a change in the gap condition. The control scheme used in these prior art servomechanisms is extremely simple, where the measured gap voltage is compared to a feed parameter, and this error is amplified by the response parameter. The resulting output is fed to a servo amplifier board that drives the DC servo motor. To optimize the performance of the hybrid servo, the feed and response parameter must be set appropriately. The optimal values are not constant for any position of the electrode in the work-piece. As the electrode drives deeper into the work-piece, the machining conditions change, because of the change in applied voltage, and the dielectric conditions at the spark gap. Therefore, many EDM machines have the facility to change the feed and response parameters in each "block" or machining depths. These must be set by studying the response characteristics of the servomechanism to these parameters.

In production EDM machines, the depth of machining is divided into machining zones or blocks. These blocks are marked in terms of depth reached by the electrode. In each block, it is possible to set various parameters such as the current, applied voltage, or the feed and response parameters. The voltage normally regulates the material removal and metallurgical properties of the work-piece; therefore, it is normally not changed frequently once the proper characteristics have been achieved. For optimal operation of the hybrid servo of the present invention, a careful study of the feed and response parameters for each block should be made, and the correct values should be set in each block. In order to maintain the theory that the base servo functions as a feeding mechanism, the feed should be set at that value that corresponds to the maximum feasible velocity achieved with a minimum of short circuits, while keeping the response low. These levels may vary with each block, and the appropriate value should be set for each block. The following general procedure may help in determining the feed and response for the base servomechanism on the EDM machine:

General Procedure for Base Servomechanism Parameter Optimization

1. Determine the effective range of values for the feed and response. A good procedure is to identify the electronic control circuit of the base servo and measure appropriate voltage outputs from the amplifiers under open circuit and short circuit conditions at the gap. Keeping the response constant, change the feed and measure the voltage to the motor drive amplifier until saturation. Repeat this for different response values. A two dimensional plot of the feed response effects is obtained. Use this to identify saturation regimes in both parameters.

2. Determine the open circuit "balance point feed value" for each voltage. This is equivalent to expressing the feed value in terms of a voltage value. Recall that the error between the feed parameter and the gap voltage drives the servo. If this servo is stationary for a given open circuit voltage and a specified feed parameter, then that value is the balance point feed value for that voltage. The feed parameter should thus be set such that the electrode is kept moving forward at the right speed, without causing short circuits.

3. Similarly, for setting the response parameter, recall that the response parameter amplifies the error between the feed and measured gap voltage, and drives the motor. Therefore, if this number is too high, the servomechanism responds quicker, but can also cause oscillations. The response should be kept as low as possible since the fast actuator 32 takes care of the response. Sometimes, it is necessary to increase this response parameter in the last few blocks, if the stroke of the fast actuator 32 is not enough to recover from short circuits.

Proper selection of feed and response parameters is important in any EDM machine, and is equally important in this case, especially if maximum cycle time gain has to be achieved.

In practice, the hybrid servomechanism of the present invention has proved to be a means for reducing the cycle time of drilling micro-holes by 20%, without affecting the metallurgical properties and dimensional accuracy of the drilled hole. While the hybrid servomechanism of the present invention has been described hereinabove as a retrofit to an existing EDM servomechanism, those having ordinary skill in the art will recognize that the present invention may easily be incorporated into a new EDM device as the controlling servomechanism.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hybrid servomechanism for micro-electrical discharge machining, comprising:

a first actuator having a first stroke length and a first frequency response;

a platform coupled to said first actuator, wherein said first actuator is operative to move said platform; and a second actuator mounted to said platform and moving with said platform, said second actuator having a second stroke length and a second frequency response; wherein the first stroke length is longer than the second stroke length and the first frequency response is slower than the second frequency response.

2. The hybrid servomechanism of claim 1, wherein said first actuator is a brush-less DC motor.

3. The hybrid servomechanism of claim 1, wherein said second actuator is a piezoelectric actuator.

4. The hybrid servomechanism of claim 1, further comprising:

an electrode coupled to said second actuator, wherein movement of said second actuator causes movement of said electrode.

5. A hybrid servomechanism for micro-electrical discharge machining, comprising:

a first actuator having a first stroke length and a first frequency response;

a first slide coupled to said first actuator, wherein said first actuator is operative to move said slide;

a base coupled to said first slide and moving with said first slide;

a second slide in contact with said base, wherein said second slide may be moved independently of said base;

a contact plate coupled to said second slide;

a clamp coupled to said contact plate; and a second actuator having a first end coupled to said first slide and a second end coupled to said clamp to effect relative motion between said first slide and said second slide, wherein said second actuator has a second stroke length and a second frequency response;

wherein the first stroke length is longer than the second stroke length and the first frequency response is slower than the second frequency response.

6. The hybrid servomechanism of claim 5, wherein said first actuator is a brush-less DC motor.

7. The hybrid servomechanism of claim 5, wherein said second actuator is a piezoelectric actuator.

8. The hybrid servomechanism of claim 5, further comprising an electrode coupled to said contact plate, wherein movement of said second actuator causes movement of said electrode.

9. The hybrid servomechanism of claim 5, wherein said base is v-shaped.

10. The hybrid servomechanism of claim 5, wherein said second slide is v-shaped.

11. The hybrid servomechanism of claim 5, further comprising PTFE material bonded to a surface of said base that contacts said second slide.

12. The hybrid servomechanism of claim 5, further comprising PTFE material bonded to a surface of said second slide that contacts said base.

13. The hybrid servomechanism of claim 5, wherein said clamp comprises a pneumatic clamp.

14. A method of controlling an electrode of a micro-electrical discharge mailing device, comprising the steps of:

a) providing a first actuator having a first stroke length and a first frequency response;

b) providing a second actuator having a second stroke length and a second frequency response, wherein the first stroke length is longer than the second stroke length and the first frequency response is slower than the second frequency response;

c) feeding said electrode toward a work-piece using said first actuator; and d) maintaining a predetermined spark gap between said electrode and said work-piece using said second actuator.

15. The method of claim 14, wherein step (a) further comprises providing a brush-less DC motor.

16. The method of claim 14, wherein step (b) further comprises providing a piezoelectric actuator.

* * * * *

UNITED STATES PATENT AND TRADEMARK OFFICE
CERTIFICATE OF CORRECTION

PATENT NO.    : 6,385,500 B1
DATED         : May 7, 2002
INVENTOR(S)   : Rajadasa Hebbar et al.

It is certified that error appears in the above-identified patent and that said Letters Patent is hereby corrected as shown below:

Column 13,
Line 20, please replace the word "mailing" with -- machining --.

Signed and Sealed this

Eighth Day of April, 2003

JAMES E. ROGAN
*Director of the United States Patent and Trademark Office*